United States Patent [19]

Przytulla et al.

[11] 4,152,104
[45] May 1, 1979

[54] HEAD FOR EXTRUDING A THERMOPLASTIC TUBULAR MEMBER

[75] Inventors: Dietmar Przytulla, Sindorf; Manfred Lehmann, Cologne, both of Fed. Rep. of Germany

[73] Assignee: Mauser Kommandit-Gesellschaft, Brühl, Fed. Rep. of Germany

[21] Appl. No.: 886,332

[22] Filed: Mar. 14, 1978

[30] Foreign Application Priority Data

Mar. 24, 1977 [DE] Fed. Rep. of Germany ....... 2712971

[51] Int. Cl.² .............................................. B29D 23/04
[52] U.S. Cl. .................................... 425/462; 264/173; 264/209; 425/133.1; 425/380; 425/467
[58] Field of Search .............................. 264/173, 209; 425/133.1, 462, 380, 381, 466, 467

[56] References Cited

U.S. PATENT DOCUMENTS

| 3,478,139 | 11/1969 | Martin et al. | 264/173 X |
| 3,546,743 | 12/1970 | Roth | 425/133.1 |
| 3,985,490 | 10/1976 | Kader | 425/466 X |
| 4,038,017 | 7/1977 | Langecker | 425/467 X |
| 4,048,428 | 9/1977 | Baird, Jr. et al. | 264/173 X |

Primary Examiner—Richard B. Lazarus
Assistant Examiner—Mark Rosenbaum
Attorney, Agent, or Firm—Toren, McGeady and Stanger

[57] ABSTRACT

In an axially extending extruder head for producing a thermoplastic tubular member, the material to be extruded is first supplied into a pair of annular first passageways spaced apart in the axial direction of the head, these passageways extend obliquely of the head axis. From the first passageways the material enters an axially elongated annular second passageway extending between the two first passageways. An annular third passage, extending transversely of the head axis, conveys the material from the second passageway into an axially extending feed passageway from which the material is extruded through the nozzle end of the head. The first, second and third passageways can be located in different parts of the extruder head.

12 Claims, 3 Drawing Figures

HEAD FOR EXTRUDING A THERMOPLASTIC TUBULAR MEMBER

SUMMARY OF THE INVENTION

The present invention is directed to an extruding head for producing a multi-layer thermoplastic tubular member in which two separate flows of thermoplastic material are provided within the head, and, more particularly, it concerns the arrangement of passageways through the head for supplying the thermoplastic material to an axially extending annular feed passageway from which the material flows through the extrusion nozzle.

In known extruding heads, the thermoplastic material is supplied from continuously or discontinuously operating extrusion devices. The material enters the extruding head in a solid form. Subsequently, after flowing around a stationary head part, the material reaches an annular feed channel in which it is formed into a tubular shape.

While the solid extruded material is shaped as an annular member, the material is cut at least once and is welded together after it flows around the stationary art. As a result, inhomogeneities occur in the thermoplastic material. These inhomogeneities may be caused by differences in temperature of adjacent material particles by different orientations of the molecules, and, by different flow velocities of the material to be welded in the feed channel. The feed velocities depend on the cross section of the various flow passageways through which the material passes before reaching the feed channel. When differences occur in such apparatus, the flow of the thermoplastic material is hindered resulting in undesired differences in the wall thickness of the extruded product which will present a varied stretching behavior if the product is used in a subsequent blowing operation.

In extruding heads having a stationary mandrel mounted by means of carriers in the extruding head cylinder, the material flows around the mandrel carriers before it is introduced into the feed channel. Mandrel carriers having staggered webs were developed to provide a stretching behavior for the product which is as uniform as possible when it is used in a blowing operation. The material to be extruded, fed centrally into the head, is split by the webs which are arranged in a staggered fashion. The splitting action is performed only at the middle of the tubular member to provide a better welding of the thermoplastic material, since the inner and outer webs are connected by a ring causing the material to separate into two layers. As a result, partial flows pass between the webs with the outer layer of each partial flow having an increased dwell time and improved orientation. Since the webs interfere with the flow of the material, the merging of the material after it passes the webs is disturbed.

Through multiple splitting of the thermoplastic material supplied in a solid form, a uniform, and, therefore, predeterminable distribution of thinner overlapping areas in the extruded tubular product is achieved. However, such a process is comparatively cumbersome. Therefore, in accordance with German Offenlegungsschrift No. 2,100,192 the mandrel carrier was formed with two cardioid shaped parts staggered by 180°. These cardioid shaped parts split the solid extruded material into two partial flows, however, each partial flow has only one thinner area. Due to the staggered arrangement of the parts by 180°, the thinner area of one layer coincides with the thicker area of another so that the cross section of the extruded tubular member exiting from the extruding head has two half-moon-shaped layers overlapping and positioned opposite to one another. The extruded tubular member does not show any vertically extending thinner areas.

This extruding head, however, is also cumbersome, since its mandrel carrier includes two parts, that is, an inner and an outer cardioid shaped part which are in overlapping relation.

The configuration of these cardioid shaped parts must be determined at a high cost and, to a large extent, empirically. Further, corrections are required for adjusting to thermoplastic material with different material coefficients or characteristics. Moreover, when such double cardioid shaped parts are used, there are differences in the flow paths between inner and outer layers and additional measures must be taken to compensate for such differences.

Therefore, the primary object of the present invention is to simplify the construction of an extruding head incorporating a pair of cardioid shaped surfaces. The configuration of the shaped surfaces should be such that they can be arranged, not only in the mandrel carrier, but also in other parts of the extruding head.

In accordance with the present invention, this simplification of the extruding head construction is attained by providing material supply means opening into a pair of separate annular shaped passageways with the center of each passageway being located on the axis of the extruding head. These annular passageways are spaced apart in the axial direction of the head and extend obliquely relative to the head axis. An axially extending annular channel or passageway interconnects the two obliquely extending pasageways. Another passageway extending transversely of the axis of the head joins the connecting passageway to an annular feed channel from which the material is extruded. An important feature of the invention is that the median plane of the passageway, joining the connecting passageway and the feed channel, intersects the axis of the head at a location equidistant from each of the pair of annular passageways. Further, the median plane extends perpendicularly of the axis of the head.

Another characteristic of the invention is the arrangement of the material inlets into the pair of annular ducts at diametrically opposite locations. Furthermore, the locations of the material inlets are spaced the maximum distance of the annular passageways from the passageway which carries the material into the feed channel.

Accordingly, aside from providing a simplified design of the extruding head, the arrangement of the extruding head embodying the present invention affords optimum flow paths for the thermoplastic material, since the lengths of the flow paths in the passageways are symmetrical, and the length of each flow path is considered as commencing at the material inlet openings into the head. As a result, as the material flows from the transverse passageway into the feed channel, it has a uniform temperature and similar orientation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE INVENTION

Figure 1:
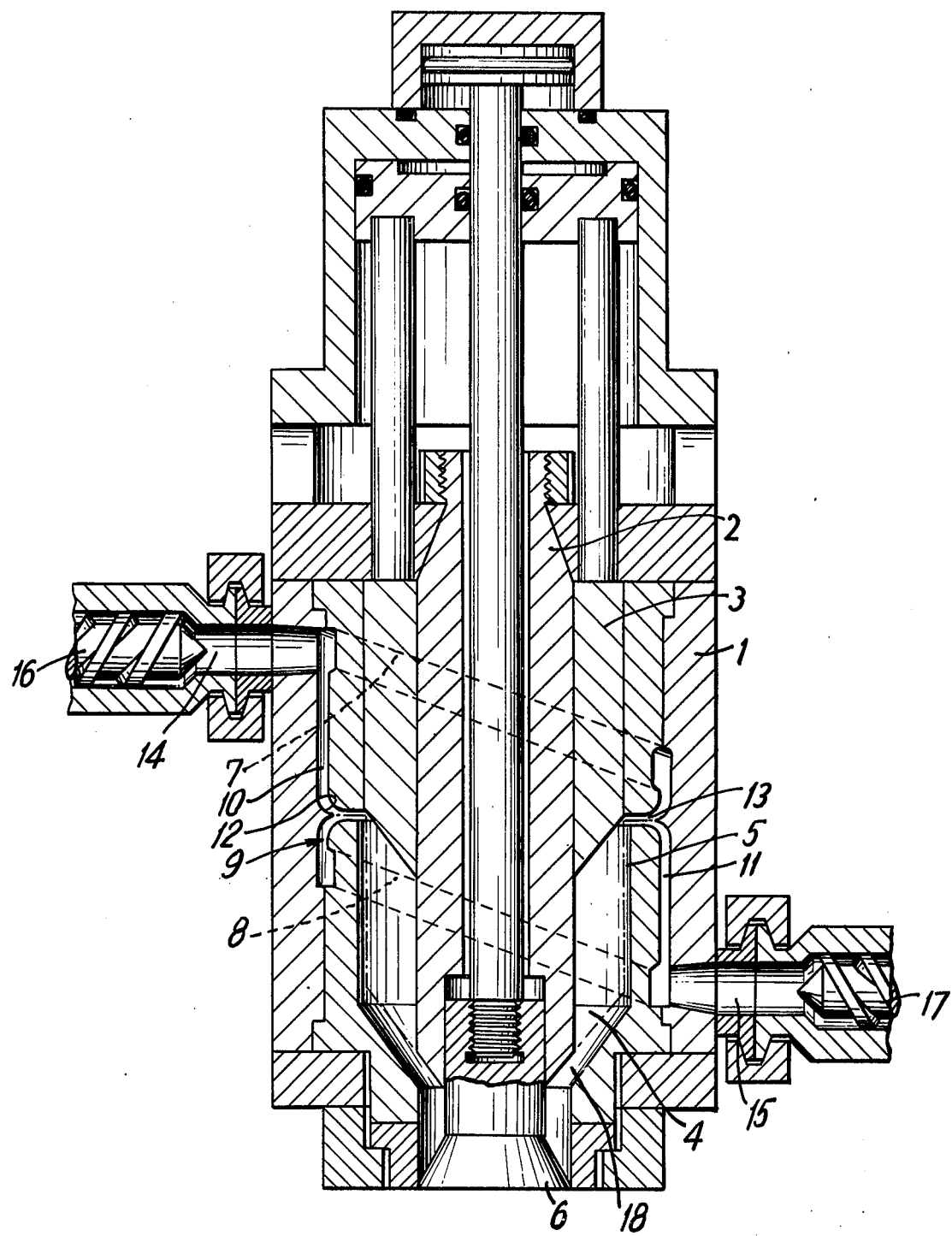
FIG. 1 is is an axially extending sectional view of a head for extruding a tubular member with a pair of annular passageways located in the cylindrical member of the head.

In the three embodiments shown in the drawing similar elements are identified by the same reference numerals.

In the drawing, the extruding head has a housing including an axially extending cyindrical member 1. The cylindrical member 1 forms a bore containing a mandrel 2 spaced radially inwardly from the surface of the bore. Located within the bore about the mandrel is an annular piston 3 which is disposed in sliding contact with the outer surface of the mandrel and the surface of the bore in the cylindrical member. In each of the embodiments shown in FIGS. 1, 2 and 3 the annular piston 3 is located in an upper position. The piston is axially displaceable through the bore between the upper position and a lower position shown in dotted lines. In the three embodiments, a storage space 4 is provided between the surface of the bore and the outer surface of the mandrel and fowardly of the end surface of the piston. In its second position, the piston is located within the storage space 4.

In FIG. 1, two annular channels or passageways 7, 8 are arranged within the cylindrical member 1 with the center of each of the annular passageways being located on the axis of the extruding head. The annular passageways 7, 8 are spaced apart in the axial direction of the cylindrical member and are interconnected by an axially extending annular connecting passageway 9. The passageway 9 consists of two passageway sections 10, 11. As viewed in FIG. 1, passageway section 10 extends downwardly from the annular passageway 7 while the passageway section 11 extends upwardly from the lower annular passageway 8. These two passageway sections meet at the location of an annular transverse passageway 13, that is, the passageway 13 extends transversely of the axially extending direction of the connecting passageway 9. The transverse passageway 13 extends radially inwardly from the connecting passageway 9 opening through the inner surface of the cylindrical member 1. At the junction of the passageway sections 10, 11, a guide surface 12 is formed projecting radially inwardly from the radially outer surfaces of the lower end of the passageway section 10 and the upper end of the passageway section 11. The guide surface 12 is formed by a pair of curved surfaces tapering to a point directed radially inwardly at the median plane of the transverse passageway 13.

A pair of material inlet openings 14, 15 are provided through the cylindrical member 1. As can be seen in FIG. 1 these two openings are located on diametrically opposite sides of the cylindrical member 1. Each of the openings, 14 and 15 has an extruding member 16, 17 associated with it for supplying the thermoplastic material forming the tubular member into the corresponding annular passageway 7, 8. After flowing into the annular passageways, the material from the passageway 7 flows into the annular passageway section 10 moving in a downward direction while the material in the passageway 8 flows into the passageway section 11 in an upward direction. The two partial flows merge at the location of the guide surface 12 and pass radially inwardly into the transverse passageway 13 where the two separate flows are welded together to form a tubular shaped member.

The annular passageways 7, 8 are disposed in parallel relation and they extend obliquely of the axis of the extruding head. The median plane of the transverse passageway 13 intersects the axis of the extruding head at a position halfway between the centers of the two obliquely extending annular passageways.

When the annular piston 3 is in its lower position, shown in dotted lines in FIG. 1, the thermoplastic material flows from the transverse passageway 13 radially inwardly into the feed channel 5 located between the radially outer surface of the piston and the radially inner surface of the cylindrical member. The material flows through the feed channel 5 to the lower or forward end of the piston 3 into another flow channel 18 located below the piston. The material within the flow channel 18 presses the annular piston 3 in the upward direction moving it to the rearward position shown in FIG. 1 in full lines with the piston displaced axially out of the storage space 4 so that more material can be introduced into the space. By pressing the annular piston 3 in the downward direction in FIG. 1, the thermoplastic material is pressed out of the storage space 4 through the annular slot provided by the nozzle 6 to the exterior of the extruding head.

Figure 2:
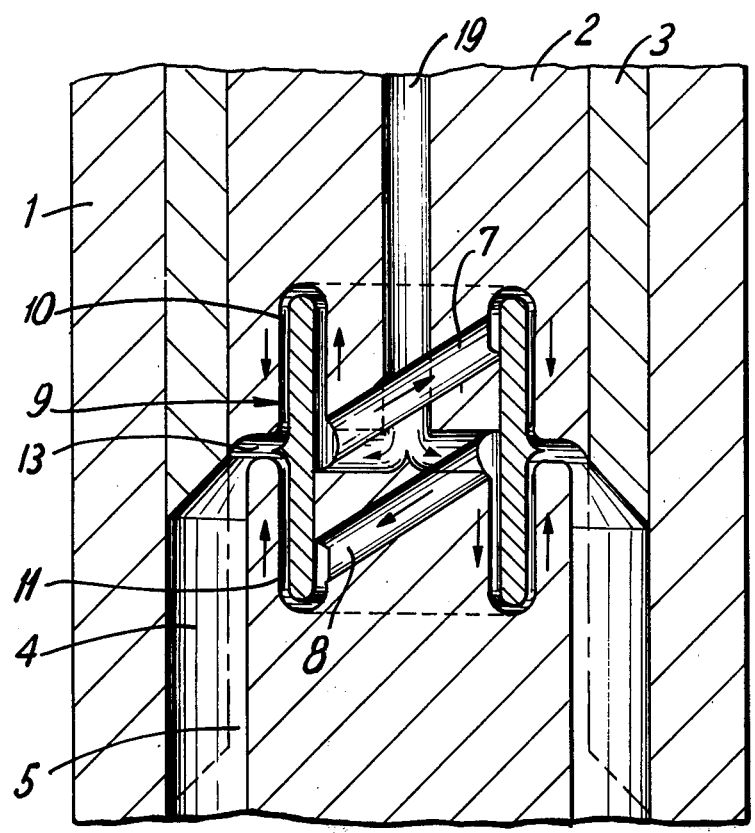
FIG. 2 is a sectional view, similar to FIG. 1, with the pair of annular passageways located within the mandrel in the head.

In FIG. 2 only a limited portion of the extrusion head is illustrated. In this embodiment, the annular passageways 7, 8 are located interiorly within the mandrel 12. Thermoplastic material supplied from an extruding device, not shown in the drawing, flows downwardly through an inlet, not shown, into the extruding head and passes through a centrally arranged channel 19 which is branched at its ends to provide a separate flow to each of the annular passageways 7, 8. Material within the passageways 7, 8 flows in the direction of the arrows into the corresponding passageway sections 10, 11 in the annular connecting passageway 9. At the junction of the two passageway sections 10, 11 the material flows form the connecting passageway 9 into the transverse passageway 13 and then radially outwardly through the surface of the mandrel 2 into the feed passageway 5 defined between the radially inner surface of the piston 3 and the radially outer surface of the mandrel 2. As in the embodiment in FIG. 1, the annular passageways 7, 8 extend obliquely of the axis of the extruding head with the two passageways being parallel. The median plane of the transverse passageway 13 intersects the axis of the extruding head midway between the locations of the centers of the two annular passageways 7 and 8 on the axis.

Figure 3:
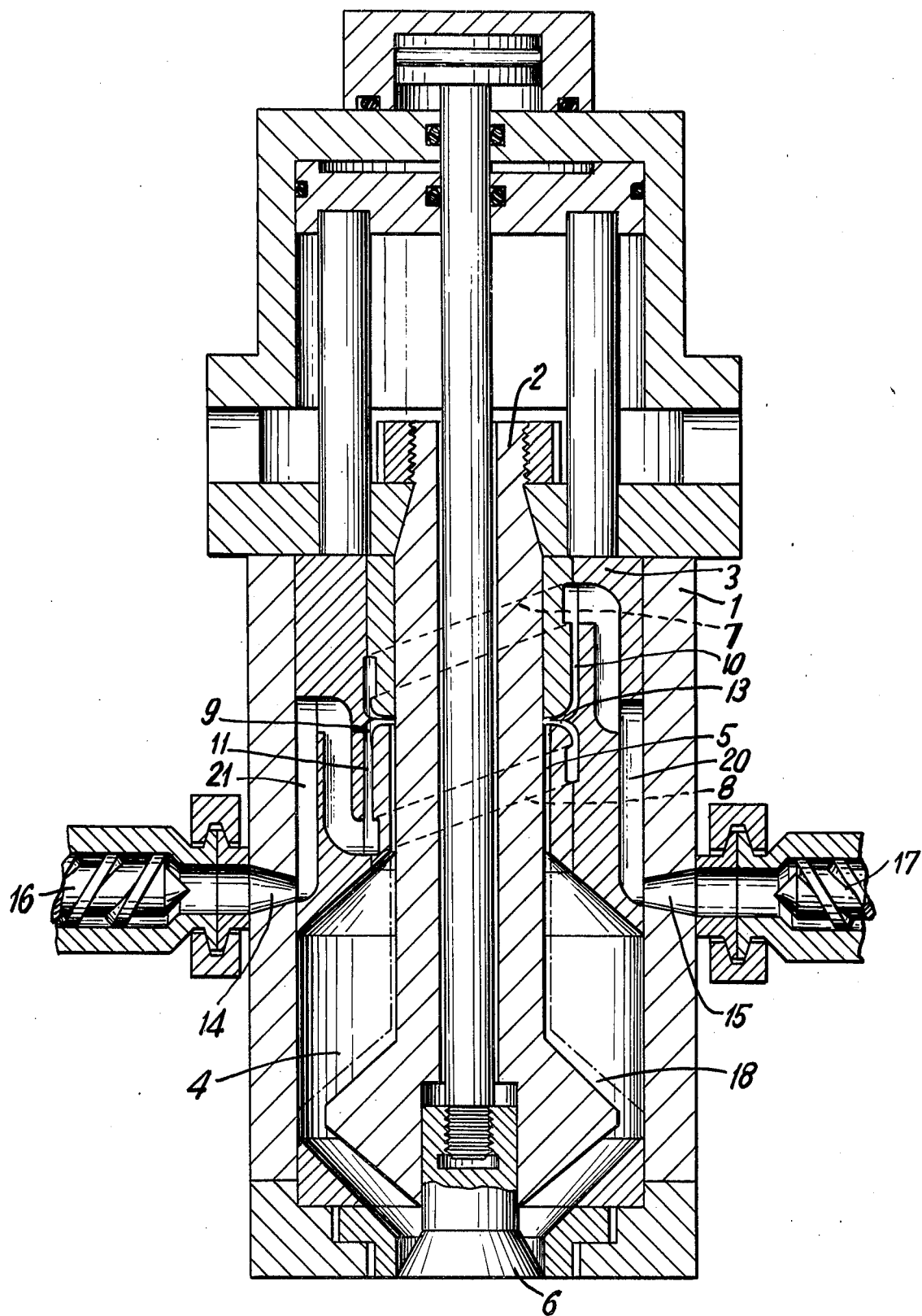
FIG. 3 is a sectional view, similar to FIGS. 1 and 2, with the pair of annular passageways arranged in the piston within the head.

In the embodiment of the extruding head illustrated in FIG. 3, the annular passageways 7, 8 are formed within the annular piston 3. As in the embodiment shown in FIG. 1, a pair of material inlet openings 14, 15 are located on diametrically opposite sides of the cylindrical member 1. Unlike FIG. 1, where the inlet openings are spaced axially apart, in FIG. 3 the inlet openings are located directly opposite one another and are not spaced apart in the axial direction of the head. The extruding devices 16, 17 supply the thermoplastic material through the openings 14 and 15 into the extruding head with the material flowing first through the axially extending grooves 20, 21 formed in the outer surface of the annular piston and then into the annular passageways 7, 8. As the piston moves through the bore in the head sliding over the mandrel, the openings 14, 15 remain in communication with the axially extending grooves 21, 20. Material flowing through the groove 20 enters the upper annular passageway 7 while the material passing through the groove 21 is supplied into the lower annular passageway 8. From these two annular passageways 7, 8, the material flows into the axially extending connecting passageway 9, that is, into the passageway sections 10, 11 associated with the annular passageways 7, 8, respectively. With the material flowing in opposite directions from the annular passageways through the passageway sections, the two flows merge at the location of the guide surface 12 projecting toward the transverse passageway 13. After flowing radially inwardly through the transverse passageway 13, the thermoplastic material enters the feed channel 5. The feed channel 5 is formed between the radially inner surface of the piston and the radially outer surface of the mandrel 2. At its lower end, the feed channel 5 opens either to the storage space 4 or to the flow passageway 18. With this arrangement, there is the additional advantage that the axial length of the feed channel 5 does not vary. Accordingly, the material experiences an equal dwell time within the feed channel 5. Furthermore, material introduced first into the storage space 4 is also the first to be ejected from that space.

While specific embodiments of the invention have been shown and described in detail to illustrate the application of the inventive principles, it will be understood that the invention may be embodied otherwise without departing from such principles.

What is claimed is:

1. Extruding head for the production of a thermoplastic tubular member, comprising a housing including an axially extending hollow cylindrical member forming an axially extending bore having a first end from which the tubular member is extruded and a second end, an axially elongated mandrel extending through said bore in the axial direction of the bore and the outer surface of said mandrel spaced radially inwardly from the surface of said bore and forming an annular space therebetween, an axially extending annular piston positioned within the annular space within said bore about said mandrel with said piston laterally enclosing said mandrel, said piston having a first end closer to the first end of said bore and a second end closer to the second end of said bore and being axially displaceable through said bore between a first position with the first end adjacent the first end of the bore and a second position with the first end thereof spaced from the first end of the bore toward the second end of the bore, first means for supplying thermoplastic material into the extruding head, said piston and one of said cylindrical member and said mandrel forming therebetween an annular feed channel open toward the first end of said bore, wherein the improvement comprises a pair of annular first passageways located within said housing and spaced apart in the axial direction of said bore, said first passageways arranged to receive the thermoplastic material from said first means, each of said first annular passageways being concentric with the axis of said bore and extending obliquely of the axis of said bore, an annular connecting second passageway located within said housing and extending in the axial direction of said bore between and in connection with said first passageways, an annular third passageway located within said housing and extending transversely of said second passageway and connecting said second passageway and said feed channel, the median plane of said third passageway extends perpendicularly of the axis of said bore and intersects the axis of said bore approximately midway between the intersection of the median planes of said first passageways with the axis of said bore.

2. Extruding head, as set forth in claim 1, wherein said first passageways are formed within said cylindrical member.

3. Extruding head, as set forth in claim 1, wherein said first passageways are formed within said mandrel.

4. Extruding head, as set forth in claim 1, wherein said first passageways are formed within said piston.

5. Extruding head, as set forth in claim 1, wherein said first means comprises an inlet opening extending in the axial direction interiorly of said mandrel and terminating in two separate branch inlets, each of said first passageways located interiorly within said mandrel and each connected to a different one of said branch inlets, said connecting second passageway located interiorly within said mandrel, said third passageway extending radially outwardly through said mandrel to the inner surface of said piston, and said annular feed channel is formed between the radially inner surface of said piston and the radially outer surface of said mandrel and is in communication with said third passageway.

6. Extruding head as set forth in claim 1, wherein said first passageways are located interiorly within said piston, said connecting second passageway extends interiorly through said piston, said third passageway extends radially inwardly through said piston from said second passageway to the radially inner surface of said piston, said annular feed channel is located between the radially inner surface of said piston and the radially outer surface of said mandrel, and said third passageway being located intermediate the first and second ends of said piston.

7. Extruding head, as set forth in claim 6, wherein said first means comprises a pair of inlet openings located in and extending through opposite sides of said cylindrical member, said inlet openings being in approximate alignment opposite one another, first longitudinal grooves connected to one of said openings, second longitudinal grooves connected to the other of said openings, said longitudinal grooves located within said piston and connecting the openings to said first passageways.

8. Extruding head, as set forth in claim 1, wherein a guide surface formed in said second passageway aligned opposite and projecting toward said third passageway for directing the flow of thermoplastic material from said second passageway into said third passageway.

9. Extruding head, as set forth in claim 8, wherein said second passageway having a first passageway section extending from one of said passageways to said guide surface and a second passageway section extending from the other one of said first passageways to said guide surface.

10. Extruding head, as set forth in claim 1, wherein said first means comprises a pair of inlet openings located on and extending through diametrically opposite sides of said cylindrical member, each of said inlet openings supplying thermoplastic material to a different one of said first passageways, an the location of each said inlet opening to the corresponding said first passageway being spaced from said third passageway the maximum distance of the corresponding said first passageway from said third passageway.

11. Extruding head, as set forth in claim 1, wherein in the second position of said piston the first end of said piston and the surface of said bore and the outer surface of said mandrel between the first end of said piston and the first end of said bore define a storage space for thermoplastic material and from which space the thermoplastic material exits from the extruder head.

12. Extruding head, as set forth in claim 10, wherein said first passageways are located interiorly within said cylindrical member, said connecting second passageway extends interiorly through said cylindrical member, said third passageway extends radially inwardly through said cylindrical member from said second passageway to the radially inner surface of said cylindrical member, and said annular feed channel is located between the radially inner surface of said cylindrical member and the radially outer surface of said piston.

* * * * *